United States Patent
Saulter et al.

(10) Patent No.: US 9,502,183 B2
(45) Date of Patent: Nov. 22, 2016

(54) METHOD FOR IMPROVING THE ELECTRICAL PARAMETERS IN CAPACITORS CONTAINING PEDOT/PSS AS A SOLID ELECTROLYTE BY POLYGLYCEROL

(75) Inventors: Armin Saulter, Düsseldorf (DE); (Continued)

(73) Assignee: Heraeus Precious Metals GmbH & Co. KG, Hanau (DE)

( * ) Notice: Subject to any disclaimer, the term of this patent is extended or adjusted under 35 U.S.C. 154(b) by 579 days.

(21) Appl. No.: 14/020,311

(22) PCT Filed: Feb. 24, 2012

(86) PCT No.: PCT/EP2012/000797
§ 371 (c)(1),
(2), (4) Date: Mar. 7, 2014

(87) PCT Pub. No.: WO2012/119711
PCT Pub. Date: Sep. 13, 2012

(65) Prior Publication Data
US 2014/0168857 A1    Jun. 19, 2014

Related U.S. Application Data

(60) Provisional application No. 61/471,939, filed on Apr. 5, 2011.

(30) Foreign Application Priority Data

Mar. 6, 2011  (DE) .................. 10 2011 013 068
Apr. 8, 2011  (DE) .................. 10 2011 016 495

(51) Int. Cl.
*H01G 9/02*     (2006.01)
*H01G 9/028*    (2006.01)
(Continued)

(52) U.S. Cl.
CPC ............ *H01G 9/028* (2013.01); *H01G 9/0036* (2013.01); *H01G 9/025* (2013.01); *H01G 9/15* (2013.01);
(Continued)

(58) Field of Classification Search
USPC .................. 361/523, 525–527; 252/62.2
See application file for complete search history.

(56) References Cited

U.S. PATENT DOCUMENTS

2005/0111165 A1   5/2005   Merker et al.
2007/0064376 A1   3/2007   Merker et al.
(Continued)

FOREIGN PATENT DOCUMENTS

| EP | 1524678 | 8/2009 |
|---|---|---|
| GB | 2447730 | 12/2011 |
| WO | WO-2007/092407 | 8/2007 |

OTHER PUBLICATIONS

ChemBuyersGuide.com, Solvay Chemicals, Inc. (Diglycerol and polyglycerols), Jan. 8, 2011.*
(Continued)

*Primary Examiner* — Eric Thomas
(74) *Attorney, Agent, or Firm* — Servilla Whitney LLC

(57) ABSTRACT

Capacitors comprising a dielectric at least partly covering the surface of an electrode material and forming an anode body are described. The anode body may be at least partly coated with a solid electrolyte comprising a conductive polymer. The capacitor comprises at least one polyglycerol, where the ratio of the amount of polyglycerol ($M_{pg}$) to the amount of conductive polymer ($M_{polymer}$) in the capacitor is $M_{pg}/M_{polymer} > 0.15$, and the polyglycerol contains more than 50 wt. % of a mixture of tri- and tetraglycerol, based on the total weight of the polyglycerol. Processes for the production of a capacitor, an electronic circuit and use of a capacitor in a dispersion are also described.

22 Claims, 3 Drawing Sheets

(75) Inventors: Katrin Asteman, Köln (DE); Udo Guntermann, Krefeld (DE); Udo Merker, Köln (DE)

(51) Int. Cl.
*H01G 9/00* (2006.01)
*H01G 9/025* (2006.01)
*H01G 9/15* (2006.01)
C25D 11/24 (2006.01)
H01G 11/48 (2013.01)
H01G 11/56 (2013.01)

(52) U.S. Cl.
CPC ............... *C25D 11/24* (2013.01); *H01G 11/48* (2013.01); *H01G 11/56* (2013.01)

(56) References Cited

U.S. PATENT DOCUMENTS

| | | |
|---|---|---|
| 2009/0128997 A1 | 5/2009 | Kikuchi et al. |
| 2009/0244812 A1 | 10/2009 | Rawal et al. |
| 2010/0165546 A1 | 7/2010 | Yoshida et al. |

OTHER PUBLICATIONS

PCT International Search Report & Written Opinion in PCT/EP2012/000797, dated May 2, 2012, 7 pgs.

\* cited by examiner

METHOD FOR IMPROVING THE ELECTRICAL PARAMETERS IN CAPACITORS CONTAINING PEDOT/PSS AS A SOLID ELECTROLYTE BY POLYGLYCEROL

CROSS-REFERENCE TO RELATED APPLICATIONS

This application is the National Stage entry of PCT/EP2012/000797, filed on Feb. 24, 2012, which claims priority to German Patent Application No. 10 2011 016 495.2, filed on Apr. 8, 2011, U.S. Provisional Application Ser. No. 61/471,939, filed on Apr. 5, 2011, and German Patent Application Number DE 10 2011 013 068.3, filed on Mar. 6, 2011, the entire contents of which are incorporated herein by reference in their entireties.

BACKGROUND

The present invention relates to a capacitor, a process for the production of a capacitor, the capacitor obtainable by this process, an electronic circuit, the use of a capacitor and a dispersion.

A commercially available electrolyte capacitor as a rule is made of a porous metal electrode, an oxide layer serving as a dielectric on the metal surface, an electrically conductive material, usually a solid, which is introduced into the porous structure, an outer electrode (contacting), such as e.g. a silver layer, and further electrical contacts and an encapsulation. An electrolyte capacitor which is frequently used is the tantalum electrolyte capacitor, the anode electrode of which is made of the valve metal tantalum, on which a uniform, dielectric layer of tantalum pentoxide has been generated by anodic oxidation (also called "forming"). A liquid or solid electrolyte forms the cathode of the capacitor. Aluminium capacitors in which the anode electrode is made of the valve metal aluminium, on which a uniform, electrically insulating aluminium oxide layer is generated as the dielectric by anodic oxidation, are furthermore frequently employed. Here also, a liquid electrolyte or a solid electrolyte forms the cathode of the capacitor. The aluminium capacitors are usually constructed as wound- or stack-type capacitors.

π-conjugated polymers are particularly suitable as solid electrolytes in the capacitors described above because of their high electrical conductivity. π-conjugated polymers are also called conductive polymers or synthetic metals. They are increasingly gaining economic importance, since polymers have advantages over metals with respect to processability, weight and targeted adjustment of properties by chemical modification. Examples of known π-conjugated polymers are polypyrroles, polythiophenes, polyanilines, polyacetylenes, polyphenylenes and poly(p-phenylene-vinylenes), a particularly important polythiophene used industrially being poly(3,4-ethylenedioxythiophene) (PEDOT), since it has a very high conductivity in its oxidized form.

The solid electrolytes based on conductive polymers can be applied to the oxide layer in various ways and manners. EP-A-0 340 512 thus describes, for example, the preparation of a solid electrolyte from 3,4-ethylenedioxythiophene and the use thereof in electrolyte capacitors. According to the teaching of this publication, 3,4-ethylenedioxythiophene is polymerized on to the oxide layer in situ. After deposition of the polymer solid electrolyte, the oxide layer of the capacitor must conventionally be re-formed in order to achieve low residual currents, as is described, for example, in EP-A-0 899 757. For this, the capacitor is impregnated in an electrolyte and exposed to an electrical voltage which does not exceed the anodizing voltage of the oxide film.

The disadvantage of the production of solid electrolyte capacitors using an in situ polymerization is however, amongst others, the complexity of the process, and furthermore usually only unsatisfactorily high breakdown voltages are achieved.

Thus, a polymerization process which in each case includes the process steps of impregnation, polymerization and washing as a rule lasts several hours. Under certain circumstances, explosive or toxic solvents must also be employed here. A further disadvantage of the in situ process for the production of solid electrolyte capacitors is that as a rule anions of the oxidizing agent or, where appropriate, other monomeric anions serve as counter-ions for the conductive polymer. Because of their small size, however, these are not bonded to the polymer in a sufficiently stable manner. As a result, diffusion of the counter-ions and therefore an increase in the equivalent series resistance (ESR) of the capacitor may occur, especially at elevated use temperatures of the capacitor. The alternative use of high molecular weight polymeric counter-ions in the chemical in situ polymerization does not lead to sufficiently conductive films and therefore does not lead to low ESR values.

Alternative processes for the preparation of solid electrolytes based on conductive polymers in electrolyte capacitors have therefore been developed in the prior art. Thus, for example, DE-A-10 2005 043828 describes a process for the production of solid electrolytes in capacitors, in which a dispersion comprising the already polymerized thiophene, for example the PEDOT/PSS dispersions known from the prior art, is applied to the oxide layer and the dispersing agent is then removed by evaporation. The capacitors obtained from PEDOT/PSS dispersions have an increased breakdown voltage compared with those obtained by means of in situ polymerization.

However, there is a need to further increase the breakdown voltage, which is a measure of the reliability of an electrolyte capacitor, in particular for high use voltages. The breakdown voltage is the voltage at which the dielectric (oxide layer) of the capacitor no longer withstands the electrical field strength and electrical breakthroughs occur between the anode and cathode, which leads to a short circuit in the capacitor. The higher the breakdown voltage, the better the quality of the dielectric and the more reliable therefore also the capacitor. The nominal voltage at which the capacitor can be employed is also higher, the higher the breakdown voltage of the capacitor.

According to the teaching of WO-A-2007/097364, JP 2008-109065, JP 2008-109068 or JP 2008-109069, an increase in the breakdown voltage in aluminium capacitors can be achieved, for example, by adding polyethylene glycols to the polymer dispersions employed for producing the solid electrolyte layer before application of the dispersion to the oxide layer. The disadvantage of this set up, however, is that the long-term stability of the capacitor is limited at high temperatures, because the electrical properties, in particular the capacitance and the equivalent series resistance (ESR) of the capacitor, deteriorate over time at high temperatures. Such capacitors are therefore not suitable in particular for use in the automobile industry, and there in particular for use, for example, as intermediate capacitors (DC link capacitors) in hybrid and electric propulsion means, since exposure to particularly high temperatures occurs here. In these fields of use, the capacitors are employed in a temperature range of from +125° C. to +150°

C. and a voltage range of from 100 V to 500 V. They must function reliably under these conditions and must have a very low equivalent series resistance (ESR), as is described, for example, by W. Wondrak et al., "*Requirements on passive components for electric and hybrid vehicles*", CARTS Europe 2010, The 22nd Annual Passive Components Symposium, Proceedings, p. 34-39.

The use of polyglycerol in capacitors with layers of conductive polymers produced by chemical or electrochemical polymerization is known from US-A-2009/128997 and JP-A-2010-129864. The teaching of both specifications is that the long-term heat stability of capacitors at high temperatures can only be achieved if polyglycerol is employed in very small amounts in the chemical or electrochemical polymerization to obtain an outer layer of conductive polymer in a capacitor with several layers of conductive polymers.

SUMMARY

A first embodiment of the invention is directed to a capacitor comprising an electrode body of an electrode material, wherein a dielectric at least partly covers a surface of the electrode material and forms an anode body. Wherein, the anode body is at least partly coated with a solid electrolyte which comprises a conductive polymer. The capacitor comprises at least one polyglycerol. The ratio of the amount by weight of polyglycerol ($M_{pg}$) in the capacitor and the amount by weight of conductive polymer ($M_{polymer}$) in the capacitor:

$M_{pg}/M_{polymer} > 0.15$, wherein the polyglycerol contains more than 50 wt. % of a mixture of a tri- and tetraglycerol, based on the total weight of the polyglycerol.

In a second embodiment, the first embodiment is modified wherein for the $M_{pg}/M_{polymer}$ ratio:

$M_{pg}/M_{polymer} > 0.2$.

In a third embodiment, the first embodiment is modified wherein for the $M_{pg}/M_{polymer}$ ratio:

$M_{pg}/M_{polymer}$ is in a range of from 0.2 to 80.

In a fourth embodiment, the first embodiment is modified wherein for the $M_{pg}/M_{polymer}$ ratio:

$M_{pg}/M_{polymer}$ is in a range of from 2.5 to 30.

In a fifth embodiment, any of the first through fourth embodiments are modified wherein the capacitor is an aluminium capacitor.

In a sixth embodiment, any of the first through fifth embodiments are modified wherein the conductive polymer comprises a polythiophene.

In a seventh embodiment, any of the first through sixth embodiments are modified wherein the conductive polymer comprises a polythiophene with recurring units of the general formula (I) or (II)

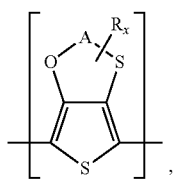

(I)

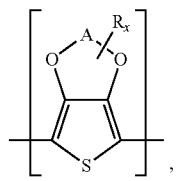

(II)

wherein

A represents an optionally substituted $C_1$-$C_5$-alkylene radical,

R represents a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical, x represents an integer from 0 to 8 and in the case where several radicals R are bonded to A, these can be identical or different.

In an eighth embodiment, the sixth or seventh embodiment is modified wherein the polythiophene comprises a poly(3,4-ethylenedioxythiophene).

In a ninth embodiment, any of the first through eighth embodiments are modified wherein the conductive polymer comprises a polyanion.

In a tenth embodiment, the ninth embodiment is modified wherein the polyanion comprises a polystyrenesulphonic acid.

In an eleventh embodiment, any of the sixth through tenth embodiments are modified wherein the conductive polymer comprises a complex of poly(3,4-ethylenedioxythiophene) and polystyrenesulphonic acid.

A twelfth embodiment of the invention is directed to a process for the production of a capacitor, comprising the process steps:

a1) providing an electrode body of an electrode material, wherein a dielectric covers one surface of this electrode material at least partly to form an anode body;

b1) introducing a dispersion comprising
  a conductive polymer,
  at least one polyglycerol, and
  a dispersing agent
into at least a part of the anode body;

c1) at least partially removing the dispersing agent to obtain a capacitor body;

or a2) providing an electrode body of an electrode material, wherein a dielectric covers one surface of the electrode material at least partly to form an anode body;

b2) introducing a dispersion comprising
  a conductive polymer, and
  a dispersing agent
into at least a part of the anode body;

c2) at least partially removing the dispersing agent to obtain a capacitor body;

d2) bringing into contact at least one polyglycerol, as an impregnating agent, with the capacitor body;

or a3) providing an electrode body of an electrode material, wherein a dielectric covers one surface of the electrode material at least partly to form an anode body;

b3) introducing a dispersion comprising
a conductive polymer,
at least one polyglycerol, and
a dispersing agent
into at least a part of the anode body;

c3) at least partially removing the dispersing agent to obtain a capacitor body;

d3) bringing into contact at least one polyglycerol, as an impregnating agent, with the capacitor body;
wherein the polyglycerol is employed in an amount such that for the ratio of the amount by weight of polyglycerol ($M_{pg}$) in the capacitor and the amount by weight of conductive polymer ($M_{polymer}$) in the capacitor:
$M_{pg}/M_{polymer} > 0.15$,
wherein the polyglycerol contains more than 50 wt. % of a mixture of a tri- and tetraglycerol, based on the total weight of the polyglycerol.

In a thirteenth embodiment, the twelfth embodiment is modified, wherein the polyglycerol is employed in an amount such that for the $M_{pg}/M_{polymer}$ ratio:
$M_{pg}/M_{polymer} > 0.2$.

In a fourteenth embodiment, the twelfth embodiment is modified, wherein the polyglycerol is employed in an amount such that for the $M_{pg}/M_{polymer}$ ratio:
$M_{pg}/M_{polymer}$ is in a range of from 0.2 to 80.

In a fifteenth embodiment, the twelfth embodiment is modified, wherein the polyglycerol is employed in an amount such that for the $M_{pg}/M_{polymer}$ ratio:
$M_{pg}/M_{polymer}$ is in a range of from 2.5 to 30.

In a sixteenth embodiment, any of the twelfth through fifteenth embodiments are modified wherein the conductive polymer comprises a polythiophene.

In a seventeenth embodiment, any of the twelfth through sixteenth embodiments are modified wherein the conductive polymer comprises a polythiophene with recurring units of the general formula (I) or (II)

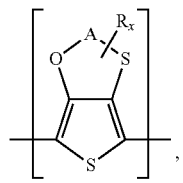

(I)

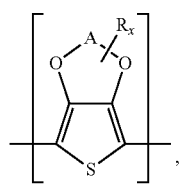

(II)

wherein
A represents an optionally substituted $C_1$-$C_5$-alkylene radical,
R represents a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical,
x represents an integer from 0 to 8 and
in the case where several radicals R are bonded to A, these can be identical or different.

In an eighteenth embodiment, any of the sixteenth or seventeenth embodiments are modified wherein the conductive polymer comprises a polyanion.

In a nineteenth embodiment, any of the twelfth through eighteenth embodiments are modified wherein the conductive polymer comprises a complex of poly(3,4-ethylenedioxythiophene) and polystyrenesulphonic acid.

In a twentieth embodiment, any of the sixteenth through nineteenth embodiments are modified wherein the polyanion comprises a polystyrenesulphonic acid.

In a twenty-first embodiment, any of the sixteenth through twentieth embodiments are modified wherein the conductive polymer comprises a complex of poly(3,4-ethylenedioxythiophene) and polystyrenesulphonic acid.

In a twenty-second embodiment, any of the sixteenth through twenty-first embodiments are modified wherein the impregnating agent is employed in process step d2) and d3) is in the form of a solution comprising a solvent and the impregnating agent and in a further process step e2) or e3) the solvent is at least partly removed from the electrode body.

A twenty-third embodiment of the invention is directed to a capacitor obtainable by a process according to any of the twelfth through twenty-second embodiments.

In a twenty-fourth embodiment of the invention, any of the first through eleventh and twenty-third embodiments are modified wherein the capacitor has a breakdown voltage of at least 50% of the activation voltage and at least one of the following properties:
(α1) an increase in the equivalent series resistance after storage of the capacitor for 674 hours at 120° C. by a factor of at most 2;
(α2) a reduction in the capacitance after storage of the capacitor for 674 hours at 120° C. by at most 6%.

A twenty-fifth embodiment of the invention is directed to an electronic circuit comprising a capacitor according to one of the first to eleventh, twenty-third or twenty-fourth embodiments.

A twenty-sixth embodiment of the invention is directed to the use of a capacitor according to one of the first through eleventh, twenty-third or twenty-fourth embodiments.

A twenty-seventh embodiment is directed to a dispersion comprising a conductive polymer and at least one polyglycerol, wherein the polyglycerol contains more than 50 wt. % of a mixture of a tri- and tetraglycerol, in each case based on the total weight of the polyglycerol.

In a twenty-eighth embodiment, the twenty-seventh embodiment is modified wherein the conductive polymer comprises poly(3,4-ethylenedioxythiophene).

BRIEF DESCRIPTION OF THE DRAWINGS

The invention is now explained in more detail with the aid of non-limiting figures.

DETAILED DESCRIPTION

Figure 1:
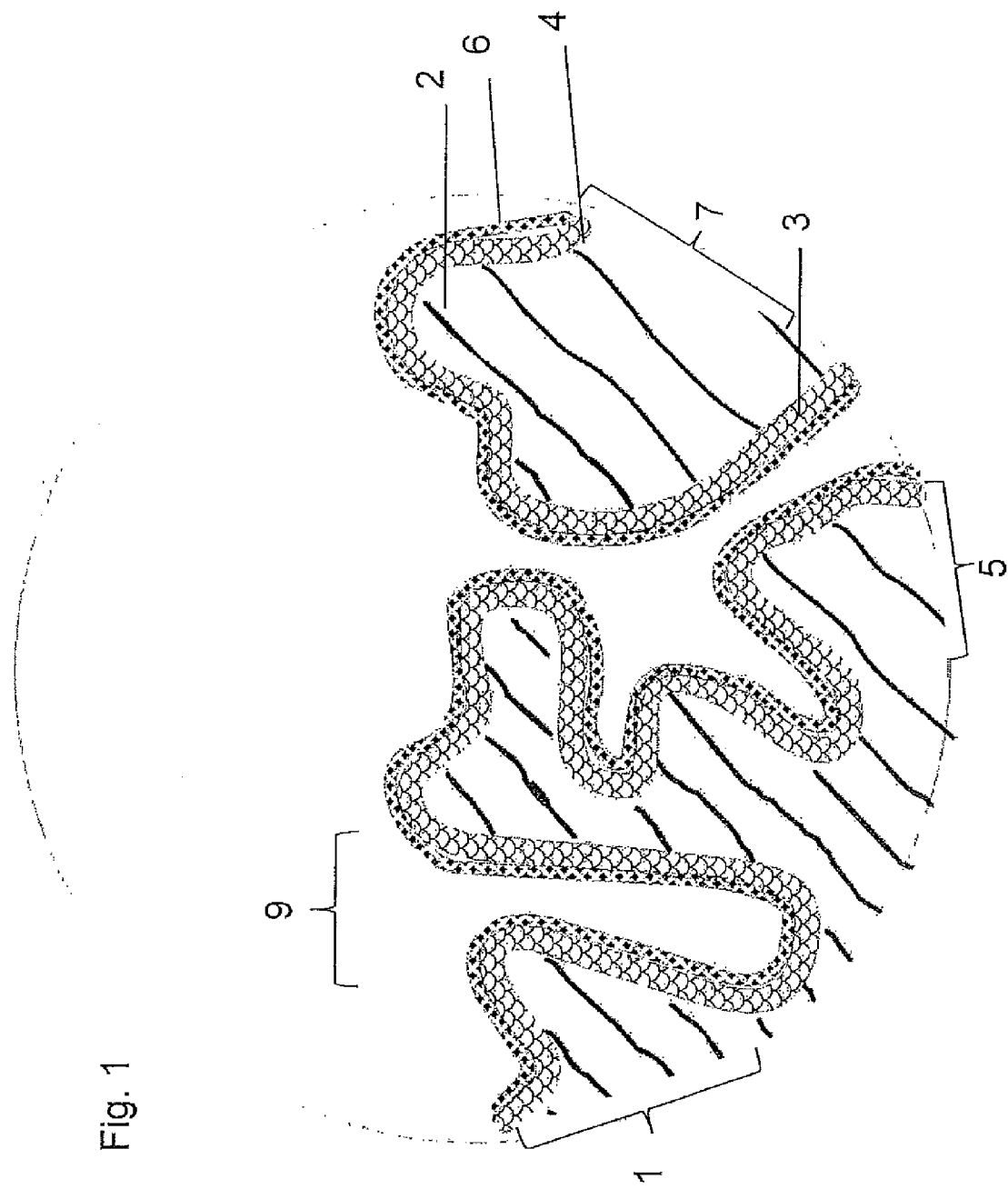
FIG. 1 is a diagram of a section through a part of a capacitor according to the invention which is obtainable by a process comprising process steps a1) to c1). This has an electrode body 1, usually made of a porous electrode material 2, such as aluminium. On the surface 4 of the electrode material 2, a dielectric 3 is formed as a thin layer, so that an anode body 5 which is still porous and comprises the electrode body 1 of the electrode material 2 and the dielectric 3 is formed. The dielectric 3 is followed, optionally after further layers, by a layer of a solid electrolyte 6 (e.g. comprising PEDOT/PSS particles), whereby a capacitor body 7 comprising the electrode body 1 of the electrode material 2, the dielectric 3 and the solid electrolyte 6 is formed. The layer of the solid electrolyte 6 contains a polyglycerol.
Figure 2:
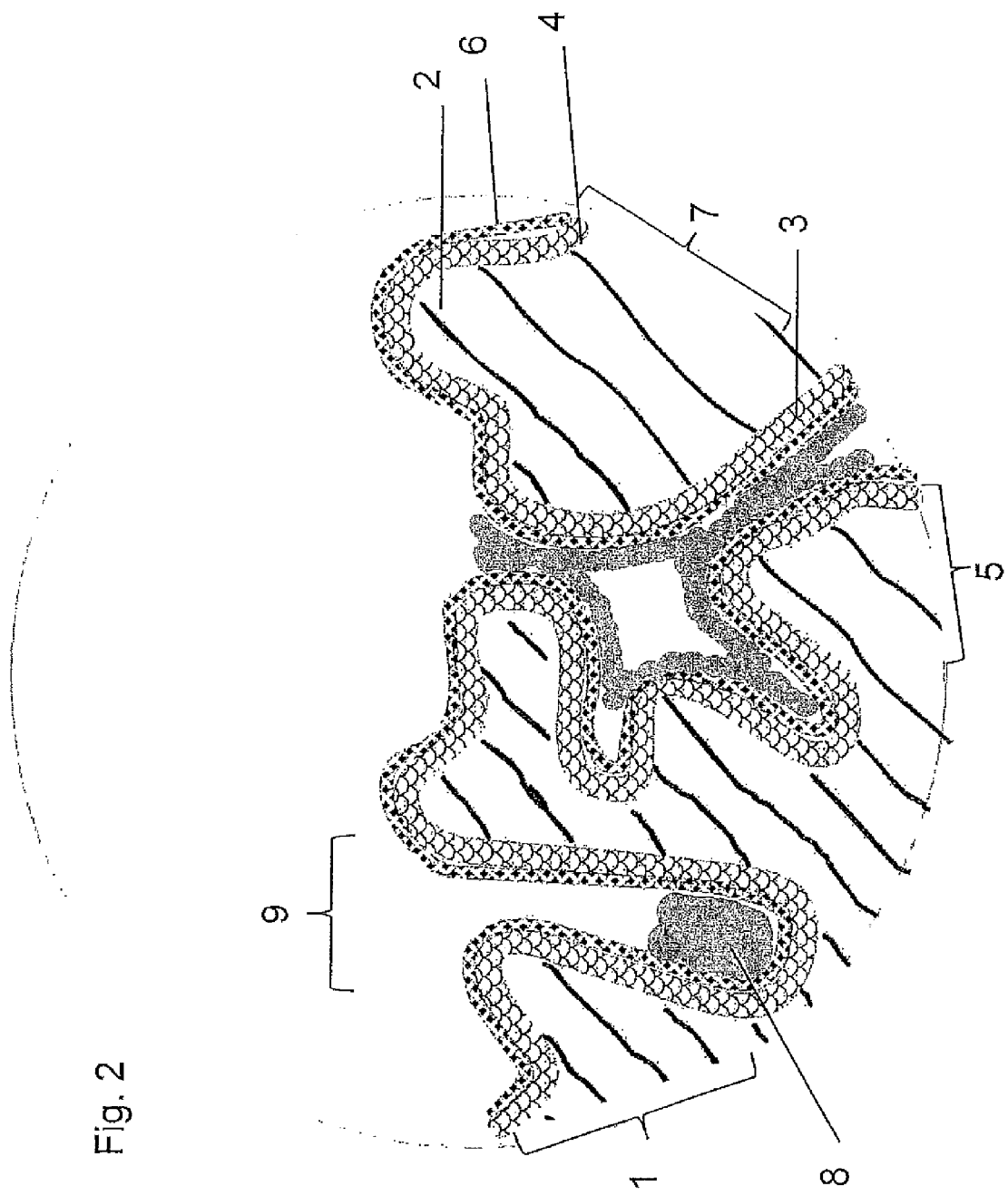
FIG. 2 is a diagram of a section through a part of a capacitor according to the invention which is obtainable by a process comprising process steps a2) to e2). A capacitor body has been impregnated here with a solution comprising a polyglycerol as the impregnating agent 8 and a solvent, so that the polyglycerol completely or partly fills the pores 9 when the solvent has been removed. It is furthermore likewise conceivable that the impregnating agent 8 is introduced into the pores 9 as such and not as a solution.
Figure 3:
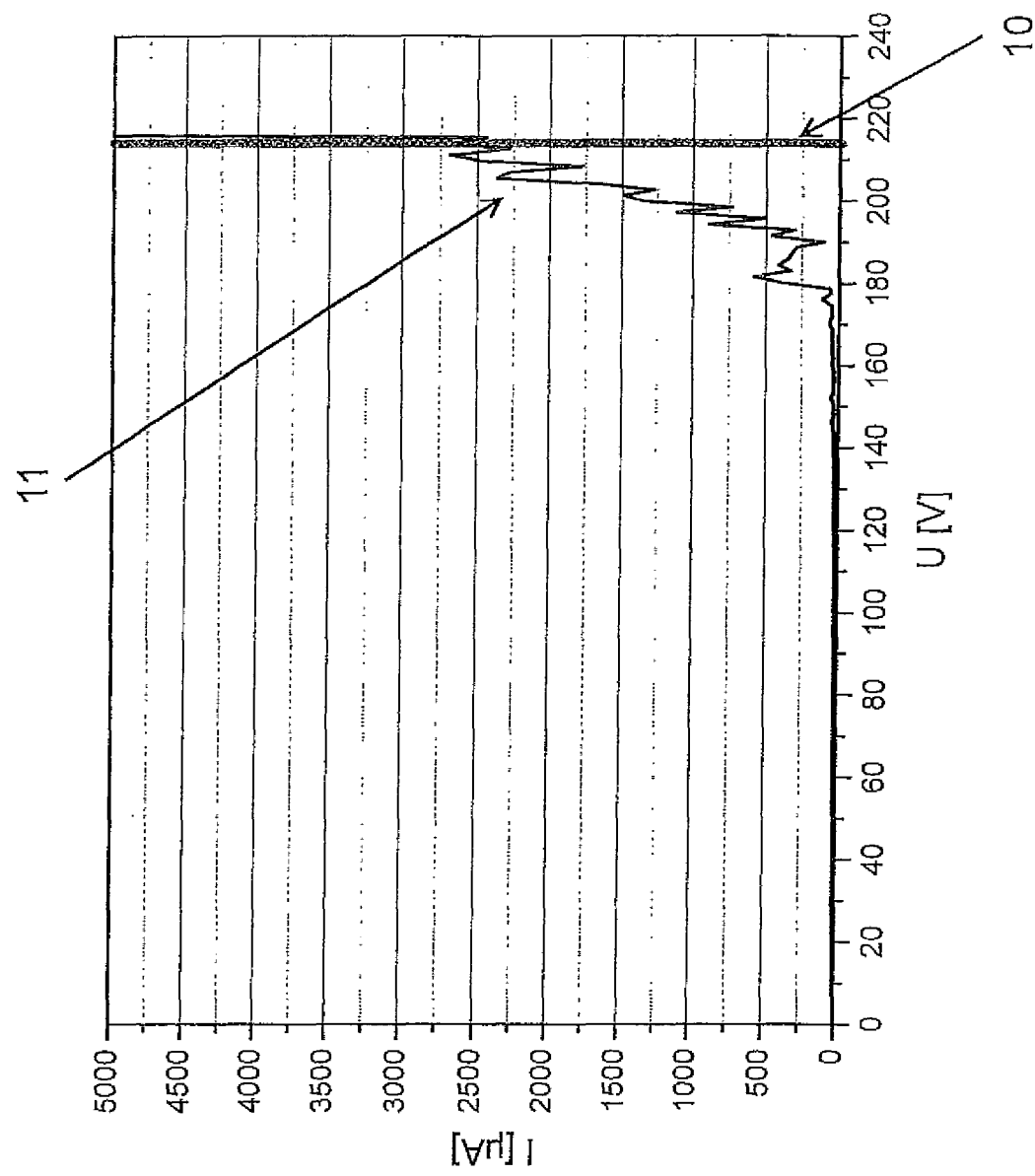
FIG. 3 shows a measurement curve for determination of the activation voltage on the capacitor obtained in Example 8. The current according to the test method for determination of the activation voltage is plotted against the voltage here. From the comparison of the forming voltage shown at 10 and the measurement curve 11, it can be seen that the increase in current characterizing the activation voltage coincides with the forming voltage which was applied during production of the capacitor.

Embodiments of the present invention overcome the disadvantages resulting from the prior art in connection with capacitors, in particular in connection with solid electrolyte capacitors, very particularly preferably in connection with the aluminium wound capacitors known from the prior art.

In particular, capacitors were to be provided which are distinguished by a particularly low equivalent series resistance, a high breakdown voltage and in particular by a storage stability at high temperatures, in particular at temperatures of more than 50° C., still more preferably more than 100° C., which is improved compared with the capacitors known from the prior art. As used in this specification and the appended claims, the term "preferably" means that subject of the preferably term is present in one or more specific or detailed embodiment. It will be understood that the use of the term "preferred" should not be taken as limiting the scope of the invention, but merely suggests one possible configuration. The improvement in the storage stability at such high temperatures is to manifest itself, in particular, in the fact that the electronic properties of the capacitor, in particular the capacitance and the equivalent series resistance, as far as possible change only slightly during storage or during use under the abovementioned temperatures.

Embodiments of the provide a process with the aid of which such advantageous capacitors can be produced.

It has been found, surprisingly, that in capacitors, in particular in aluminium wound capacitors, with solid electrolytes based on polythiophenes, polyglycerols not only lead to an improvement in the breakdown voltage in the capacitor similar to that from the use of polyethylene glycols which is known from the prior art, but at the same time also increase the heat stability of the capacitor in a significant manner. Polyglycerols show an even better long-term stability of the capacitor at high temperatures compared with diglycerol. In particular, the heat stability is even better if the content of diglycerols in the solid electrolyte layer is decreased. For this, polyglycerols are preferably added to the conductive polymer dispersion in concentrations which correspond at least to the solids content of conductive polymer or of complex of conductive polymer and polyanion, preferably the solids content of PEDOT/PSS, in the dispersion, preferably even in higher concentrations, in order to increase the breakdown voltage and the heat stability of the capacitor.

Embodiments of the invention are directed to capacitors comprising an electrode body of an electrode material, wherein a dielectric at least partly covers the surface of this electrode material and forms an anode body, wherein the anode body is at least partly coated with a solid electrolyte which comprises a conductive polymer, wherein the capacitor comprises at least one polyglycerol, wherein for the ratio of the amount by weight of polyglycerol ($M_{pg}$) in the capacitor and the amount by weight of conductive polymer ($M_{polymer}$) in the capacitor:

$M_{pg}/M_{polymer}>0.15$, wherein the polyglycerol contains more than 50 wt. %, preferably more than 60 wt. % and particularly preferably in a range of from 50 to 85 wt. % and furthermore preferably in a range of from 60 to 85 wt. % of a mixture of a tri- and tetraglycerol, in each case based on the total weight of the polyglycerol. According to the invention, it is moreover furthermore preferable for the mixture of tri- and tetraglycerol to have a ratio of tri- to tetraglycerol in a range of from 1:1.5 to 1:5.5.

In one embodiment of the capacitor according to the invention, it is preferable for the polyglycerol described above to be part of the solid electrolyte. It is accordingly preferable for the solid electrolyte to comprise at least 1 wt. %, preferably at least 3 wt. % and particularly preferably at least 5 wt. % of the conductive polymer and at least 10 wt. %, preferably at least 20 wt. % and particularly preferably at least 35 wt. % of polyglycerol as a constituent, the sum of the wt. % of all the constituents of the solid electrolyte being 100.

According to the invention, it is furthermore preferable for the polyglycerol to contain less than 20 wt. %, preferably less than 15 wt. % and particularly preferably less than 12 wt. %, in each case based on the polyglycerol, of heptaglycerol and higher glycerols. This embodiment has proved to be particularly suitable for case I described in more detail below. If the content of such polyglycerols is too high, deposition of these higher-chain polyglycerols on the solid electrolyte can occur especially at a high polyglycerol content in the dispersion employed for the preparation of the solid electrolyte.

Preferably, $M_{pg}/M_{polymer}>0.2$, still more preferably $M_{pg}/M_{polymer}$ is in a range of from 0.2 to 80, furthermore preferably in a range of from 0.4 to 60, particularly preferably in the range from 1 to 50, exceptionally preferred in the range from 1.5 to 40, extremely preferably in a range of from 2.5 to 30 and most preferably in the range from 3 to 25. In a further embodiment of the invention, it is preferable for $M_{pg}/M_{polymer}$ to be in a range of from 0.2 to 20, preferably in a range of from 0.5 to 15, particularly preferably in a range from 1 to 10, exceptionally preferable in a range from 1.6 to 8 and extremely preferably in a range of from 2.5 to 5. This embodiment has proved to be particularly suitable for the case I described in more detail below. In another embodiment of the invention, it is preferable for $M_{pg}/M_{polymer}$ to be in a range of from 4 to 80, preferably in a range of from 8 to 50 and particularly preferably in a range of from 10 to 20. This embodiment has proved to be particularly suitable for each of the cases II. and III described in more detail in the following.

The capacitor according to the invention comprises a preferably porous electrode body of an electrode material, wherein a dielectric at least partly covers the surface of this electrode material and forms an anode body, In principle, the electrode body can be produced by pressing a valve metal powder of high surface area and sintering it to give a usually porous electrode body. An electrical contact wire, preferably of a valve metal, such as e.g. tantalum, is conventionally also pressed into the electrode body here. The electrode body is then coated, for example by electrochemical oxidation, with a dielectric, i.e. an oxide layer. Alternatively, metal foils can also be etched, and coated with a dielectric by electrochemical oxidation in order to obtain an anode foil with a porous region. In a wound capacitor, an anode foil with a porous region, which forms the electrode body, and a cathode foil are separated by separators and wound up.

In the context of the invention, valve metal is to be understood as meaning those metals of which the oxide layers do not render possible current flow equally in both directions. In the case of an anodically applied voltage, the oxide layers of the valve metals block the current flow, while in the case of a cathodically applied voltage large currents occur, which may destroy the oxide layer. The valve metals include Be, Mg, Al, Ge, Si, Sn, Sb, Bi, Ti, Zr, Hf, V, Nb, Ta and W and an alloy or compound of at least one of these metals with other elements. The best known representatives of the valve metals are Al, Ta and Nb. Compounds with electrical properties comparable to a valve metal are those with metallic conductivity, which can be oxidized and of which the oxide layers have the properties described above. For example, NbO has metallic conductivity, but in general is not regarded as a valve metal. Layers of oxidized NbO have, however, the typical properties of valve metal oxide layers, so that NbO or an alloy or compound of NbO with other elements are typical examples of such compounds with electrical properties comparable to a valve metal. Electrode materials of tantalum, aluminium and those electrode materials based on niobium or niobium oxide are preferred. Aluminium is particularly preferred as the electrode material.

For production of the electrode body often with a porous region, the valve metals can be sintered, for example in powder form, to give a usually porous electrode body, or a porous structure is stamped on a metallic body. The latter can be carried out e.g. by etching a foil.

For simplicity, bodies with a porous region are also called "porous" in the following. Thus, for example, electrode bodies with a porous region are also called porous electrode bodies. On the one hand, the porous bodies can be permeated by a plurality of channels and therefore be sponge-like. This is often the case if tantalum is used for the production of capacitors. Furthermore, it is possible for only the surface to have pores and for the region following under the surface pores to be solid in construction. Such a situation is often observed if aluminium is used for the production of capacitors.

The often porous electrode bodies produced in this manner are then oxidized, for example, in a suitable electrolyte, such as e.g. phosphoric acid or an aqueous solution of ammonium adipate, by application of a voltage, in order to form the dielectric. The level of this forming voltage depends on the oxide layer thickness to be achieved or the later use voltage of the capacitor. Preferred forming voltages are in a range of from 1 to 2,000 V. A distinction is often made between low voltage and high voltage capacitors. In the case of low voltage capacitors, forming voltages are preferably in a range of from 1 to 300 V, particularly preferably in a range of from 3 to 250 V and further preferably in a range of from 5 to 150 V and furthermore preferably 6 to 100 V. In the case of high voltage capacitors, forming voltages are preferably in a range of from 30 to 1,900 V, particularly preferably in a range of from 50 to 1,600 V and further preferably in a range of from 100 to 1,500 V and furthermore preferably 150 to 1,400 V.

The electrode bodies employed for the production of the capacitors according to the invention preferably have a porosity of from 10 to 90%, preferably from 30 to 80%, particularly preferably from 50 to 80%, and an average pore diameter of from 10 to 10,000 nm, preferably from 50 to 5,000 nm, particularly preferably from 100 to 3,000 nm.

According to a first particular embodiment of the capacitor according to the invention, the capacitor is an aluminium capacitor, particularly preferably an aluminium wound capacitor.

The capacitor according to the invention furthermore has a solid electrolyte with which the anode body is at least partly coated, this solid electrolyte comprising a conductive polymer and at least one polyglycerol.

Here in particular, "conductive polymers" are understood as meaning the compound class of π-conjugated polymers which have an electrical conductivity after oxidation or reduction. Preferably, conductive polymers are understood as meaning those π-conjugated polymers which, after oxidation, have an electrical conductivity of the order of at least $0.1$ S cm$^{-1}$. According to a particularly preferred embodiment according to the invention, the conductive polymer comprises an anion, preferably a polyanion. Anions and cations are then present in the conductive polymer. The two components together then form the conductive polymer.

In this connection, it is particularly preferable for the conductive polymer to comprise a polythiophene, particularly preferably a polythiophene with recurring units of the general formula (I) or (II) or a combination of units of the general formulae (I) and (II), preferably a polythiophene with recurring units of the general formula (II)

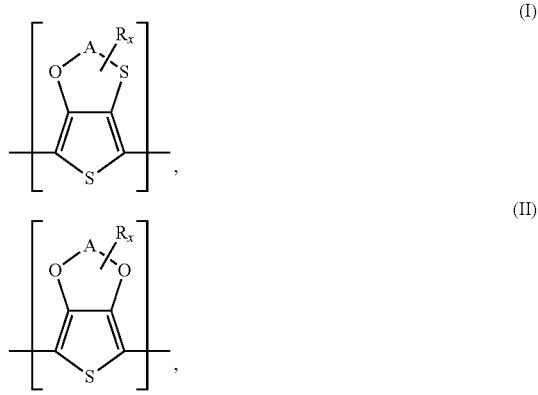

wherein

A represents an optionally substituted $C_1$-$C_5$-alkylene radical,

R represents a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical, x represents an integer from 0 to 8 and in the case where several radicals R are bonded to A, these can be identical or different.

The general formulae (I) and (II) are to be understood as meaning that x substituents R can be bonded to the alkylene radical A.

Polythiophenes with recurring units of the general formula (II) wherein A represents an optionally substituted $C_2$-$C_3$-alkylene radical and x represents 0 or 1 are particularly preferred. Poly(3,4-ethylenedioxythiophene), which is optionally substituted, is very particularly preferred as the conductive polymer of the solid electrolyte.

In the context of the invention, the prefix poly- is to be understood as meaning that the polymer or polythiophene contains more than one identical or different recurring units of the general formula (I) or (II). In addition to the recurring units of the general formula (I) or (II), the polythiophenes can optionally also comprise other recurring units, but it is preferable for at least 50%, particularly preferably at least 75% and most preferably at least 95% of all recurring units of the polythiophene to have the general formula (I) and/or (II), particularly preferably (II). The polythiophenes contain n recurring units of the general formula (I) and/or (II) in total, wherein n is an integer from 2 to 2,000, preferably 2 to 100. The recurring units of the general formula (I) or (II) can in each case be identical or different within a polythiophene. Polythiophenes with in each case identical recurring units of the general formula (II) are preferred.

The polythiophenes preferably in each case carry H on the end groups.

In the context of the invention, $C_1$-$C_5$-alkylene radicals A are preferably methylene, ethylene, n-propylene, n-butylene or n-pentylene. $C_1$-$C_{18}$-alkyl radicals R preferably represent linear or branched $C_1$-$C_{18}$-alkyl radicals, such as methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl or n-octadecyl, $C_5$-$C_{12}$-cycloalkyl radicals R represent, for example, cyclopentyl, cyclohexyl, cycloheptyl, cyclooctyl, cyclononyl or cyclodecyl, $C_5$-$C_{14}$-aryl radicals R represent, for example, phenyl or naphthyl, and $C_7$-$C_{18}$-aralkyl radicals R represent, for example, benzyl, o-, m-, p-tolyl, 2,3-, 2,4-, 2,5-, 2,6-, 3,4-, 3,5-xylyl or mesityl. The preceding list serves to illustrate the invention by way of example and is not to be considered conclusive.

In the context of the invention, numerous organic groups are possible optional further substituents of the radicals A and/or of the radicals R, for example alkyl, cycloalkyl, aryl, aralkyl, alkoxy, halogen, ether, thioether, disulphide, sulphoxide, sulphone, sulphonate, amino, aldehyde, keto, carboxylic acid ester, carboxylic acid, carbonate, carboxylate, cyano, alkylsilane and alkoxysilane groups and carboxamide groups.

The polythiophenes contained in the conductive polymer can be neutral or cationic. In preferred embodiments they are cationic, "cationic" relating only to the charges on the polythiophene main chain. The polythiophenes can carry positive and negative charges in the structural unit, depending on the substituent on the radicals R, the positive charges being on the polythiophene main chain and the negative charges optionally being on the radicals R substituted by sulphonate or carboxylate groups. In this context, the positive charges of the polythiophene main chain can be partly or completely satisfied by the anionic groups optionally present on the radicals R. Overall, in these cases the polythiophenes can be cationic, neutral or even anionic. Nevertheless, in the context of the invention they are all regarded as cationic polythiophenes, since the positive charges on the polythiophene main chain are the deciding factor. The positive charges are not shown in the formulae, since their precise number and position cannot be determined absolutely. However, the number of positive charges is at least 1 and at most n, wherein n is the total number of all recurring units (identical or different) within the polythiophene.

To compensate the positive charge, if this is not already done by the optionally sulphonate- or carboxylate-substituted and therefore negatively charged radicals R, the cationic polythiophenes require anions as counter-ions, it being possible for the counter-ions to be monomeric or polymeric anions. Polymeric anions are also called polyanions in the following. In the case where polyanions are employed, it is particularly preferable for the conductive polymer to comprise complexes of polythiophenes and polyanions, very particularly preferably complexes of poly(3,4-ethylenedioxythiophene) and polystyrenesulphonic acid.

Polyanions are preferable to monomeric anions, since they contribute towards film formation and because of their size lead to electrically conductive films which are more stable to heat. Polyanions here can be, for example, anions of polymeric carboxylic acids, such as polyacrylic acids, polymethacrylic acid or polymaleic acids, or of polymeric sulphonic acids, such as polystyrenesulphonic acids and polyvinylsulphonic acids. These polycarboxylic and -sulphonic acids can also be copolymers of vinylcarboxylic and vinylsulphonic acids with other polymerizable monomers, such as acrylic acid esters and styrene. Particularly preferably, the solid electrolyte contains an anion of a polymeric carboxylic or sulphonic acid for compensation of the positive charge of the polythiophene.

The anion of polystyrenesulphonic acid (PSS), which, if a polythiophene is used, in particular poly(3,4-ethylenedioxythiophene), is preferably present bonded as a complex in the form of the PEDOT/PSS complexes known from the prior art, is particularly preferred as the polyanion. Such complexes are obtainable by polymerizing the thiophene monomers, preferably 3,4-ethylenedioxythiophene, oxidatively in aqueous solution in the presence of polystyrenesulphonic acid.

The molecular weight of the polyacids which supply the polyanions is preferably 1,000 to 2,000,000, particularly preferably 2,000 to 500,000. The polyacids or their alkali salts are commercially obtainable, e.g. polystyrenesulphonic acids and polyacrylic acids, or can be prepared by known processes (see e.g. Houben Weyl, Methoden der organischen Chemie, vol. E 20 Makromolekulare Stoffe, part 2, (1987), p. 1141 et seq.).

Polyanions and polythiophenes, in particular polystyrenesulphonic acid and poly(3,4-ethylenedioxythiophene) can be present in the conductive polymer and also in the solid electrolyte in a weight ratio of from 0.5:1 to 50:1, preferably from 1:1 to 30:1, particularly preferably 2:1 to 20:1. The weight of the electrically conducting polymers here corresponds to the weight of the monomers employed for the preparation of the conductive polymers, assuming that complete conversion takes place during the polymerization. According to a particular embodiment of the capacitor according to the invention, the polystyrenesulphonic acid is present in an excess by weight compared with the polythiophene, in particular poly(3,4-ethylenedioxythiophene).

Monomeric anions which are used are, for example, those of $C_1$-$C_{20}$-alkanesulphonic acids, such as methane-, ethane-, propane-, butanesulphonic acid or higher sulphonic acids, such as dodecanesulphonic acid, of aliphatic perfluorosulphonic acids, such as trifluoromethanesulphonic acid, perfluorobutanesulphonic acid or perfluorooctanesulphonic, of aliphatic $C_1$-$C_{20}$-carboxylic acids, such as 2-ethylhexylcarboxylic acid, of aliphatic perfluorocarboxylic acids, such as trifluoroacetic acid or perfluorooctanoic acid, and of aromatic sulphonic acids optionally substituted by $C_1$-$C_{20}$-alkyl groups, such as benzenesulphonic acid, o-toluenesulphonic acid, p-toluenesulphonic acid or dodecylbenzenesulphonic acid, and of cycloalkanesulphonic acids, such as camphorsulphonic acid, or tetrafluoroborates, hexafluorophosphates, perchlorates, hexafluoroantimonates, hexafluoroarsenates or hexachloroantimonates.

In addition to the conductive polymer or the complex of conductive polymer and polyanion, preferably in addition to the PEDOT/PSS complexes described above, the layer of the solid electrolyte also comprises at least one polyglycerol.

According to the invention, the term "polyglycerol" is understood as meaning oligomers of glycerol which are made up of at least three glycerol units. However, in addition to such oligomers made up of at least three glycerol units, the solid electrolyte can also additionally comprise glycerol or diglycerol. It is advantageous, however, if the amount of oligoglycerols of three or more glycerol units in the solid electrolyte is high enough for the ratio of the amount by weight of these polyglycerols ($M_{pg}$) in the capacitor and the amount by weight of conductive polymer ($M_{polymer}$) in the capacitor to reach the minimum values described above.

The solid electrolyte can contain, in particular, technical grade polyglycerols, which comprise, in particular, diglycerol, triglycerol, tetraglycerol, pentaglycerol, hexaglycerol and optionally oligomers of more than six glycerol units. Such polyglycerols are obtainable, for example, from SOLVAY CHEMICALS GmbH, Rheinberg, Germany, under the names "Polyglycerol-3" (contains about 29 wt. % of diglycerol, about 42 wt. % of triglycerol, about 19 wt. % of tetraglycerol, about 6 wt. % of pentaglycerol and about 4 wt. % of polyglycerols of six or more glycerol units) or "Polyglycerol-4" (contains about 2 wt. % of diglycerol, about 40 wt. % of triglycerol, about 35 wt. % of tetraglycerol, about 20 wt. % of pentaglycerol and about 8 wt. % of polyglycerols of six or more glycerol units).

According to the invention, it is preferable for the polyglycerol or the polyglycerols to be employed in solutions, also called the impregnating solution. Water and alcohols, in particular methanol, ethanol, n- and iso-propanol or butanol, and mixtures thereof are preferred as solvents of these solutions. These solutions comprise at least 20 wt. %, preferably at least 35 wt. % and particularly preferably at least 45 wt. % of solvent and at least 20 wt. %, preferably at least 35 wt. % and particularly preferably at least 45 wt. % of polyglycerol and optionally further additives which differ from these, in each case based on the solution, the sum of the wt. % being 100.

The solid electrolyte can comprise the conductive polymer and the polyglycerol in any conceivable mixture forms. Thus, I. the polyglycerol can be mixed uniformly in the conductive polymer. This is achieved in particular by the polyglycerol being a constituent of the dispersion comprising the conductive polymer, as is described, in particular, in the processes disclosed below including process steps a1) to c1). On the other hand, II. the polyglycerol in the solid electrolyte layer can have a higher concentration in the region facing away from the anode body than in the region following this facing away from the anode body. This is preferably achieved by the anode body coming into contact with the polyglycerol, for example by impregnation, before the contact with the conductive polymer, whether by application of the dispersion comprising the conductive polymer or by in situ polymerization. This is described in the processes disclosed later including process steps a4) to d4) or a5) to d5). Furthermore, III. the polyglycerol in the solid electrolyte layer can have a higher concentration in the region facing away from the anode body than in the region facing the anode body. This is achieved, for example, by the anode body first being coated with the conductive polymer, whether by in situ polymerization or contact, such as impregnation with the dispersion comprising the conductive polymer, and thereafter being treated, preferably impregnated, with the polyglycerol. This is described in particular in the processes disclosed later including process steps a2) to d2).

In cases II and III it is in each case preferable for the dispersion comprising the conductive polymer to contain less than 5 wt. %, preferably less than 1 wt. %, particularly preferably less than 0.1 wt. % and furthermore preferably less than 0.01 wt. %, in each case based on the dispersion comprising the conductive polymer, of polyglycerol and therefore to be low in or free from polyglycerol. Thus, preferably, in cases II and III. the layer structure on the anode body can be obtained from at least two layers, one of which is made up of the conductive polymer with less than 5 wt. %, preferably less than 1 wt. % and particularly preferably less than 0.1 wt. %, in each case based on the conductive polymer, of polyglycerol, and a layer of conductive polymer which is low in or even free from polyglycerol is obtained in this way. It is furthermore preferable for the polyglycerol layer following the layer of conductive polymer to contain less than 5 wt. %, preferably less than 1 wt. % and particularly preferably less than 0.1 wt. %, in each case based on the polyglycerol in the layer, of conductive polymer, and a layer of polyglycerol which is low in or even free from conductive polymer is obtained in this way.

In the capacitors according to the invention, the thickness of the dielectric layer is preferably 30 nm and more, particularly preferably 50 nm and more and still more preferably 100 nm and more. In some cases, the layer thickness is a maximum of 5,000 nm. Preferred oxide film thicknesses, for example, for capacitors of which the electrode material is based on aluminium are greater than 30 nm, particularly preferably greater than 50 nm, very particularly preferably greater than 100 nm, extremely preferably greater than 150 nm. Preferred oxide film thicknesses, for example, for capacitors of which the electrode material is based on tantalum are greater than 50 nm, particularly preferably greater than 80 nm, very particularly preferably greater than 150 nm, extremely preferably greater than 250 nm. Preferred oxide film thicknesses, for example, for capacitors of which the electrode material is based on niobium or niobium oxide are greater than 80 nm, particularly preferably greater than 130 nm, very particularly preferably greater than 250 nm, extremely preferably greater than 400 nm. Further details of dielectric layers are to be found in WO 2007/031207, page 13, line 9 to page 14, line 16.

According to a particular embodiment of the capacitor according to the invention, this has at least one, preferably all of the following properties:

(α1) an increase in the equivalent series resistance after storage of the capacitor for 674 hours at 120° C. by a factor of at most 2, particularly preferably at most 1.7 and most preferably at most 1.3;

(α2) a reduction in the capacitance after storage of the capacitor for 674 hours at 120° C. by at most 6%, particularly preferably by at most 4% and most preferably by at most 2%;

(α3) a breakdown voltage of at least 50% of the activation voltage, particularly preferably of at least 70% and most preferably of at least 80%.

In this connection, particularly preferred embodiments of capacitors according to the invention are those with the following properties or combinations of properties: (α1), (α2), (α3), (α1)(α2), (α1)(α3), (α2)(α3), (α1)(α2)(α3).

One or more embodiments of the invention are made by a process for the production of a capacitor, comprising the process steps:
a1) the provision of an electrode body of an electrode material, wherein a dielectric covers one surface of this electrode material at least partly to form an anode body;
b1) the introduction of a dispersion comprising
 a conductive polymer,
 at least one polyglycerol, and
 a dispersing agent
 into at least a part of the anode body;
c1) at least partial removal of the dispersing agent to obtain a capacitor body;
or
a2) the provision of an electrode body of an electrode material, wherein a dielectric covers one surface of this electrode material at least partly to form an anode body;
b2) the introduction of a dispersion comprising
 a conductive polymer, and
 a dispersing agent
 into at least a part of the anode body;
c2) at least partial removal of the dispersing agent to obtain a capacitor body;
d2) the bringing into contact of at least one polyglycerol, as an impregnating agent, with the capacitor body;
or
a3) the provision of an electrode body of an electrode material, wherein a dielectric covers one surface of this electrode material at least partly to form an anode body;
b3) the introduction of a dispersion comprising
 a conductive polymer,
 at least one polyglycerol, and
 a dispersing agent
 into at least a part of the anode body;
c3) at least partial removal of the dispersing agent to obtain a capacitor body;
d3) the bringing into contact of at least one polyglycerol, as an impregnating agent, with the capacitor body;
wherein the polyglycerol is employed in an amount such that, preferably is contained in the dispersion in an amount such that and/or is employed in process step d2) or d3) in an amount such that for the ratio of the amount by weight of polyglycerols ($M_{pg}$) in the capacitor and the amount by weight of conductive polymer (M polymer) in the capacitor:
 $M_{pg}/M_{polymer} > 0.15$,
wherein the polyglycerol contains more than 50 wt. %, preferably more than 60 wt. % and particularly preferably in a range of from 50 to 85 wt. % and furthermore preferably in a range of from 60 to 85 wt. % of a mixture of a tri- and tetraglycerol, in each case based on the total weight of the polyglycerol. According to the invention, it is moreover further preferable for the mixture of tri- and tetraglycerol to have a ratio of tri- to tetraglycerol in a range of from 1:1.5 to 1:5.5. According to the invention, it is furthermore preferable for the polyglycerol to contain less than 20 wt. %, preferably less than 15 wt. % and particularly preferably less than 12 wt. %, in each case based on the polyglycerol, of heptaglycerol and higher glycerols. This embodiment has proved to be particularly suitable for the case I) described in more detail above.

$M_{PG}/M_{Polymer}$ is preferably $>0.2$, even more preferably $M_{PG}/M_{Polymer}$ is in a range from 0.2 to 80, furthermore preferably in a range of from 0.4 to 60, particular preferably in the range from 1 to 50, exceptionally preferably in the range from 1.5 to 40, extremely preferably in a range of from 2.5 to 30 and most preferably in the range from 3 to 25. In a further embodiment of the invention, it is preferable for $M_{pg}/M_{polymer}$ to be in a range of from 0.2 to 20, preferably in a range of from 0.5 to 15, particularly preferably in a range from 1 to 10, exceptionally preferably in a range from 1.6 to 8 and extremely preferably in a range of from 2.5 to 5. This embodiment has proved to be particularly suitable for the case I. described above. In another embodiment of the invention, it is preferable for $M_{pg}/M_{polymer}$ to be in a range of from 4 to 80, preferably in a range of from 8 to 50 and particularly preferably in a range of from 10 to 20. This embodiment has proved to be particularly suitable for each of the cases II) and III) described above.

In case I) described above the dispersion in process step b1) preferably comprises 0.4 to 40 wt.-% of the polyglycerol, based on the total weight of the dispersion, more preferably 1 to 30 wt.-%, particularly preferably 2 to 20 wt.-%, especially preferably 3 to 15 wt.-% and extremely preferably 4 to 13 wt.-%.

A further embodiment of the process according to the invention comprises the process steps:
a4) the provision of an electrode body of an electrode material, wherein a dielectric covers one surface of this electrode material at least partly to form an anode body;
b4) the bringing into contact of at least one polyglycerol, as an impregnating agent, with the anode body;
c4) the introduction of a dispersion comprising
 a conductive polymer,
 at least one polyglycerol, and
 a dispersing agent
 into at least a part of the anode body;
d4) at least partial removal of the dispersing agent to obtain a capacitor body, wherein here also the above $M_{pg}/M_{polymer}$ relationships apply.

Another embodiment of the process according to the invention comprises the process steps:
a5) the provision of an electrode body of an electrode material, wherein a dielectric covers one surface of this electrode material at least partly to form an anode body;
b5) the bringing into contact of at least one polyglycerol, as an impregnating agent, with the anode body;
c5) the introduction of a dispersion comprising
 a conductive polymer, and
 a dispersing agent
 into at least a part of the anode body;
d5) at least partial removal of the dispersing agent to obtain a capacitor body, wherein here also the above $M_{pg}/M_{polymer}$ relationships apply.

The capacitors according to the invention comprising a layer of a solid electrolyte which comprises a conductive polymer and at least one polyglycerol can accordingly be obtained by a procedure
i) in which a polyglycerol, which either is added to the dispersion, preferably a PEDOT/PSS dispersion, comprising the conductive polymer (process with process steps a1) to c1)) or which is brought into contact with the anode body before the application of the dispersion, preferably a PEDOT/PSS dispersion, comprising the conductive polymer (process with process steps a4) to d4) and a5) to d5)), is already employed before or during the production of the solid electrolyte;

ii) in which after formation of a layer of the solid electrolyte, this is impregnated with a solution or dispersion of the polyglycerol (process according to process steps a2) to d2)), or iii) in which the processes according to i) and ii) are combined with one another (process according to process steps a3) to d3).

In process step a1), a2), a3), a4) and a5), an electrode body of an electrode material, wherein a dielectric covers one surface of this electrode material at least partly to form an anode body, is provided. The method and manner of the production of such electrode bodies has already been described in detail above in connection with the capacitor according to the invention, and preferred electrode bodies are likewise those which have been described above in connection with the capacitor according to the invention.

According to a particularly preferred embodiment of the process according to the invention, the provision of the electrode body in process steps a1), a2), a3), a4) and a5) includes the anodic forming of a porous aluminium foil as the electrode material, an aluminium oxide coating forming as the dielectric. The aluminium foil (anode foil) obtained in this manner is then provided with a contact wire and wound up with a further porous aluminium foil (cathode foil) likewise provided with a contact wire, these two foils being spaced from one another by one or more separator papers, which are based e.g. on cellulose or, preferably, on synthetic papers. After being wound up, the anode bodies obtained in this way are fixed, for example by means of an adhesive tape. The separator paper or papers can be carbonized by heating in an oven. This method and manner of production of anode bodies for aluminium wound capacitors is adequately known from the prior art and is described, for example, in U.S. Pat. No. 7,497,879 B2.

In process step b1), b2), b3), c4) and c5), a dispersion comprising a conductive polymer and a dispersing agent is then introduced into at least a part of the anode body, it being possible for the dispersion according to process steps b1) and b3) additionally to already comprise at least one polyglycerol.

The dispersions are introduced, preferably into the porous region of the anode body, by known processes, e.g. impregnation, dipping, pouring, dripping on, spraying, misting on, knife coating, brushing or printing, for example ink-jet, screen or tampon printing. The introduction is preferably carried out by dipping the anode body provided in process step a1), a2), a3), a4) and a5) into the dispersion and thus impregnating it with this dispersion. The dipping into or the impregnation with the dispersion is preferably carried out for a period in a range of from 1 second to 120 minutes, particularly preferably in a range of from 10 seconds to 60 minutes and most preferably in a range of from 30 seconds to 15 minutes. The introduction of the dispersion into the anode body can be facilitated, for example, by increased or reduced pressure, vibration, ultrasound or heat.

The introduction of the dispersion into the anode body can be carried out directly or using an adhesion promoter, for example a silane, such as e.g. organofunctional silanes or hydrolysates thereof, e.g. 3-glycidoxypropyltrialkoxysilane, 3-aminopropyltriethoxysilane, 3-mercapto-propyltrimethoxysilane, 3-methacryloxypropyltrimethoxysilane, vinyltrimethoxysilane or octyltriethoxysilane, and/or one or more other functional layers.

As a result of the introduction, the dispersion preferably covers the pores of the porous region with a layer rather less. Rather, the surfaces of the cavities of the pores are at least partly coated with the dispersion. The conductive polymers present preferably as particles in the dispersion thus not only form a layer covering the openings of the pores; at least parts, often also all regions of the surface of the pores are also covered with a layer of the particles of the dispersion.

Preferred conductive polymers are in turn those polymers which have already been described above as preferred conductive polymers in connection with the capacitor according to the invention, the use of a conductive polymer comprising poly(3,4-ethylenedioxythiophene) and polystyrenesulphonic acid being very particularly preferred. The use of a conductive polymer which comprises complexes of poly(3,4-ethylenedioxythiophene) and polystyrenesulphonic acid and is preferably present in the form of a particle-containing dispersion is very particularly preferred in this connection.

The particles, in particular the particles of the conductive polymer, of the dispersion have a specific electrical conductivity of greater than 100 S/cm. In this context, the specific electrical conductivity of the particles is the specific electrical conductivity of the film in the dry state which forms from the particles on drying of the dispersion. Preferably, dispersions in which the particles have a specific electrical conductivity of greater than 150 S/cm, particularly preferably greater than 250 S/cm, very particularly preferably greater than 400 S/cm, extremely preferably greater than 750 S/cm are employed. In some cases particles with a specific conductivity of a maximum of 5,000 S/cm are also employed.

According to a particular embodiment of the process according to the invention, the particles, in particular the particles of the conductive polymer, in the dispersion can have a diameter $d_{50}$ in a range of from 1 to 70 nm, preferably in a range of from 1 to less than 40 nm, preferably one in a range of from 1 to 35 nm, particularly preferably a range of from 1 to 30 nm and very particularly preferably in a range of from 5 to 25 nm.

According to a particular embodiment of the process according to the invention, the particles of the conductive polymer in the dispersion can furthermore have a $d_{90}$ value of the diameter distribution of less than 100 nm, particularly preferably less than 70 nm, very particularly preferably less than 50 nm. According to another particular embodiment of the process according to the invention, the particles of the conductive polymer in the dispersion have a $d_{10}$ value of the diameter distribution of greater than 1 nm, particularly preferably greater than 3 nm, very particularly preferably greater than 5 nm.

The dispersion preferably has a purity with respect to metals and transition metals as described in WO 2010/003874 A2 on page 6, lines 10 to 29. The low concentrations of metals in the dispersions have the great advantage that the dielectric is not damaged during formation of the solid electrolyte and in later operation of the capacitor.

The dispersions contain one or more dispersing agents, preferred dispersing agents being water, organic solvents or mixtures of organic solvent and water.

Dispersing agents which may be mentioned are, for example, the following solvents: aliphatic alcohols, such as methanol, ethanol, i-propanol and butanol; aliphatic ketones, such as acetone and methyl ethyl ketone; aliphatic carboxylic acid esters, such as ethyl acetate and butyl acetate; aromatic hydrocarbons, such as toluene and xylene; aliphatic hydrocarbons, such as hexane, heptane and cyclohexane; chlorohydrocarbons, such as methylene chloride and dichloroethane; aliphatic nitriles, such as acetonitrile; aliphatic sulphoxides and sulphones, such as dimethylsulphoxide and sulpholane; aliphatic carboxylic acid amides, such as methylacetamide, dimethylacetamide and dimethylformamide; aliphatic and araliphatic ethers, such as diethyl ether and anisole. Water or a mixture of water with the abovementioned organic solvents can furthermore also be used as a dispersing agent.

Preferred dispersing agents are water or other protic solvents, such as alcohols, e.g. methanol, ethanol, i-propanol and butanol, and mixtures of water with these alcohols; water is the particularly preferred dispersing agent.

The dispersion can moreover contain, apart from the conductive polymer, the dispersing agent and, in the case of process steps b1) and b3), the at least one polyglycerol, further components, such as surface-active substances which differ from polyglycerols, e.g. ionic and nonionic surfactants or adhesion promoters, such as e.g. organofunctional silanes or hydrolysates thereof, e.g. 3-glycidoxypropyltrialkoxysilane, 3-aminopropyltriethoxysilane, 3-mercaptopropyltrimethoxysilane, 3-methacryloxypropyltrimethoxysilane, vinyltrimethoxysilane or octyltriethoxysilane, crosslinking agents, such as melamine compounds, masked isocyanates, functional silanes—e.g. tetraethoxysilane, alkoxysilane hydrolysates, e.g. based on tetraethoxysilane, epoxysilanes, such as 3-glycidoxypropyltrialkoxysilane—polyurethanes, polyacrylates or polyolefin dispersions.

Preferably, the dispersions comprising conductive polymers contain further additives which increase the conductivity, such as N,N-dimethylacetamide, N-methylacetamide, N,N-dimethylformamide (DMF), N-methylformamide, N-methylformanilide, N-methylpyrrolidone (NMP), N-octylpyrrolidone, pyrrolidone, sulphones and sulphoxides, such as sulpholane (tetramethylene sulphone), dimethylsulphoxide (DMSO), sugars or sugar derivatives, such as e.g. sucrose, glucose, fructose, lactose, sugar alcohols, such as sorbitol, mannitol, erythritol, furan derivatives, such as 2-furancarboxylic acid, 3-furancarboxylic acid, and/or di- or polyalcohols, such as ethylene glycol, glycerol, di- and triethylene glycol. N-Methylformamide, N-methylpyrrolidone, ethylene glycol, dimethylsulphoxide or sorbitol are particularly preferably employed as conductivity-increasing additives.

The dispersions comprising conductive polymers can moreover contain one or more organic binders which are soluble in organic solvents, as described in WO 2009/141209 A1 on page 12, lines 16 to 34. The dispersions can have a pH of from 1 to 14, a pH of from 2 to 11 being preferred and particularly preferably a pH of from 2 to less than 4 or from 4 to 9. For corrosion-sensitive dielectrics, such as, for example, aluminium oxides or niobium oxides, dispersions with a pH of from 2.5 to 8 are preferred, so that the dielectric is not damaged.

To adjust the pH, for example, bases or acids, as described in WO 2010/003874 A2 on page 4, lines 13 to 32, can be added to the dispersions comprising conductive polymers. Those additions which do not impair the film formation of the dispersions and are not volatile at higher temperatures, e.g. soldering temperatures, but remain in the solid electrolyte under these conditions, such as the bases 2-dimethylaminoethanol, ammonia, 2,2'-iminodiethanol or 2,2',2"-nitrilotriethanol, are preferred, ammonia being particularly preferred.

The viscosity of the dispersion comprising conductive polymers can be between 0.1 and 1,000 mPas (measured with a rheometer at 20° C. and a shear rate of 100 s$^{-1}$), depending on the method of application. Preferably, the viscosity is 1 to 500 mPas, particularly preferably between 10 to 200 mPas, very particularly preferably 40 to 150 mPas.

If a dispersion which, in addition to the conductive polymer and the dispersing agent, also comprises at least one polyglycerol is employed in process step b1), b3) or c4) according to the variant with process steps a1) to c1), the variant with process steps a3) to d3) or, respectively, the variant with process steps a4) to d4), such a dispersion can in principle be obtained by mixing a conventional PEDOT/PSS dispersion, for example the dispersion obtainable under the name Clevios®P from HERAEUS CLEVIOS GmbH, Leverkusen, with polyglycerol, it being possible, for example, for the technical grade polyglycerols of SOLVAY CHEMICALS GmbH described above to be employed here. It is also conceivable to prepare dispersions comprising polyglycerols by preparing the conductive polymers in the presence of the polyglycerols. In the case of a PEDOT/PSS dispersion, this can be realized, for example, by polymerization of the thiophene monomers in the presence of polystyrenesulphonic acid in a solvent comprising polyglycerols. The amount of polyglycerol in the dispersion is to be chosen in this context such that the ratio of the amount by weight of polyglycerol to the amount by weight of conductive polymer in the solid electrolyte layer formed in process step c1) or c3) is in the range described above.

The solids content of the dispersion comprising conductive polymers employed in process step b1), b2), b3), c4) and c5) is preferably in a range of from 0.1 to 20 wt. %, particularly preferably in a range of from 0.5 to 10 wt. % and most preferably in a range of from 1 to 5 wt. %, in each case based on the total weight of the dispersion comprising conductive polymers. The solids content is determined via drying of the dispersion at a temperature which is sufficiently high to remove the dispersing agent, but without thereby decomposing the solid.

After the anode bodies have been impregnated with the dispersion described above, in process step c1), c2), c3), d4) and d5) the dispersing agent contained in the dispersion is at least partly removed or hardened, so that a solid electrolyte which completely or partly covers the dielectric, and therefore a capacitor body is formed. In this context it is preferable for the covering of the dielectric by the solid electrolyte to be preferably at least 50%, particularly preferably at least 70% and most preferably at least 80%, which can be determined by measurement of the capacitance of the capacitor in the dry and in the wet state, as is described in DE-A-10 2005 043 828.

The removal or hardening is preferably carried out by removing the electrode body from the dispersion and drying it, the drying preferably being carried out at a temperature in a range of from 20° C. to 200° C., particularly preferably in a range of from 50° C. to 175° C. and most preferably in a range of from 80° C. to 150° C. Process steps b1), b2), b3), c4) and c5), c1), c2), c3), d4) and d5) can also be repeated once or several times, in order in this manner to adapt the thickness of the layer of the solid electrolyte deposited on the dielectric or the degree of filling of the solid electrolyte in the electrode body to the particular requirements.

In process step d2) and d3) of the process according to the invention, at least one polyglycerol is brought into contact with the capacitor body obtained in process step c2) and c3) respectively, it being preferable for the at least one polyglycerol to be employed in the form of a solution comprising a solvent and the polyglycerol, and, in a further process step e2) or e3), for the solvent to be at least partly removed from the solution introduced into the capacitor body, preferably to the extent of more than 50 wt. %, preferably to the extent of more than 90 wt. % and particularly preferably to the extent of more than 98 wt. %.

The polyglycerol is brought into contact with the capacitor body, more precisely with the layer of the solid electrolyte, by known processes, e.g. impregnation, dipping, pouring, dripping on, spraying, misting on, knife coating, brushing or printing, for example ink-jet, screen or tampon printing. The bringing into contact is preferably carried out by dipping the capacitor body obtained in process step c2) or c3) into a solution containing the polyglycerol and thus impregnating it with the polyglycerol. The dipping into or the impregnation with the solution is preferably carried out for a period in a range of from 1 second to 120 minutes, particularly preferably in a range of from 10 seconds to 60 minutes and most preferably in a range of from 30 seconds to 15 minutes. The bringing into contact of the solution comprising the polyglycerol with the capacitor body or with the layer of the solid electrolyte can be facilitated, for example, by increased or reduced pressure, vibration, ultrasound or heat.

All the solvents known to the person skilled in the art in which polyglycerols can be dissolved or dispersed and with which the capacitor body can be impregnated can be used as the solvent for the polyglycerol. The use of water or an alcohol or a mixture thereof as the solvent is particularly preferred according to the invention.

The concentration of polyglycerols in the impregnating solution can be, for example, in a range of from 1 to 99 wt. %, preferably in a range of from 5 to 95 wt. %, particularly preferably in a range of from 10 to 80 wt. % and most preferably in a range of from 25 to 60 wt. %, in each case based on the total weight of the impregnating solution.

If a solution comprising a solvent and the polyglycerol is employed in process step d2) or d3) and in the further process step e2) or e3) respectively the solvent is at least partly removed from solution introduced into the capacitor body, it is preferable for this removal preferably to be carried out by removing the capacitor body from the solution and drying it. The drying is preferably carried out at a temperature in a range of from 20° C. to 200° C., particularly preferably in a range of from 50° C. to 175° C. and most preferably in a range of from 75° C. to 150° C. and for a period in a range of from 1 minute to 120 minutes, particularly preferably in a range of from 5 minutes to 90 minutes and most preferably in a range of from 10 minutes to 60 minutes.

Before the drying, it may prove to be advantageous in this process stage to rinse the capacitor body with liquid, for example with water, in order to remove solution adhering to the outer surfaces of the capacitor body with the polyglycerol.

After the end of process steps c1), d2) and e2), d3) and e3), d4) and d5), the electrolyte capacitors can be finished by the method and manner known to the person skilled in the art. In the case of a tantalum electrolyte capacitor, the capacitor bodies can be covered, for example, with a graphite layer and a silver layer, as is known from DE-A-10 2005 043 828, while in the case of an aluminium wound capacitor, in accordance with the teaching of U.S. Pat. No. 7,497,879 B2, the capacitor body is incorporated in an aluminium beaker, provided with a sealing inspection glass and firmly closed mechanically by crimping. The capacitor can then be freed from defects in the dielectric in a known manner by ageing.

According to the invention, it is furthermore preferable for the capacitor to have a breakdown voltage of at least 50% of the activation voltage and at least one, preferably each of the following properties:

(α1) an increase in the equivalent series resistance after storage of the capacitor for 674 hours at 120° C. by a factor of at most 2;

(α2) a reduction in the capacitance after storage of the capacitor for 674 hours at 120° C. by at most 6%.

One or more embodiments of the invention are directed to capacitors obtainable by the process described above. According to a particular embodiment, the capacitors obtainable by the process according to the invention have a breakdown voltage of at least 50% of the activation voltage, particularly preferably of at least 70% and most preferably of at least 80%, and additionally at least one, preferably all of the following properties:

(α1) an increase in the equivalent series resistance after storage of the capacitor for 674 hours at 120° C. by a factor of at most 2, particularly preferably at most 1.7 and most preferably at most 1.3;

(α2) a reduction in the capacitance after storage of the capacitor for 674 hours at 120° C. by at most 6%, particularly preferably by at most 4% and most preferably by at most 2%.

One or more embodiments of the invention are directed to electronic circuits comprising a capacitor according to the invention or a capacitor obtainable by the process according to the invention. In this connection there are to be mentioned, for example, electronic circuits such as are found, for example, in computers (desktop, laptop, server), in computer peripherals (e.g. PC cards), in portable electronic equipment, such as e.g. mobile telephones, digital cameras or electronic entertainment systems, in devices for electronic entertainment systems, such as e.g. in CD/DVD players and computer games consoles, in navigation systems, in telecommunications installations, in domestic appliances, in medical technology, e.g. for defibrillators, in power supplies, such as those based on renewable energy, or in automobile electronics, such as e.g. for hybrid or electric automobiles. However, according to the invention electronic circuits in hybrid or electric propulsion means for an automobile are particularly preferred. The capacitors can serve in particular as intermediate capacitors (DC link capacitors) here.

One or more embodiments are directed to the use of a capacitor according to the invention or of a capacitor obtainable by the process according to the invention in electronic circuits, but in particular as an intermediate capacitor in an electronic circuit in hybrid or electric propulsion means for an automobile.

One or more embodiments are directed to a dispersion comprising a conductive polymer, preferably poly(3,4-ethylenedioxythiophene), and at least one polyglycerol, wherein the polyglycerol contains more than 50 wt. %, preferably more than 60 wt. % and particularly preferably in a range of from 50 to 85 wt. % and furthermore preferably in a range of from 60 to 85 wt. % of a mixture of a tri- and tetraglycerol, in each case based on the total weight of the polyglycerol. According to the invention, it is moreover furthermore preferable for the mixture of tri- and tetraglycerol to have a ratio of tri- to tetraglycerol in a range of from 1:1.5 to 1:5.5. Particular preferred polyglycerols according to the invention are those that have already been mentioned at preferred polyglycerols at the beginning in connection with the capacitor according to the present invention.

It is preferred that the dispersion comprises 0.4 to 40 wt.-% of the polyglycerol, based on the total weight of the dispersion, more preferably 1 to 30 wt.-%, particularly preferably 2 to 20 wt.-%, especially preferably 3 to 15 wt.-% and extremely preferably 4 to 13 wt.-%.

Embodiments of the invention are now explained in more detail with the aid of the following non-limiting examples.

Measurement Methods

Equivalent Series Resistance

The equivalent series resistance (in mΩ) was determined at 20° C. at 100 kHz by means of an LCR meter (Agilent 4284A). In each case 10 capacitors were produced and the mean was determined.

Capacitance

The capacitance (in microfarads) was determined at 20° C. at 120 Hz by means of an LCR meter (Agilent 4284A). In each case 10 capacitors were produced and the mean was determined.

Breakdown Voltage

For determination of the breakdown voltage, the voltage applied to the capacitors, starting at 0 V, was increased by 1 V/s and at the same time the current was measured with a Keithley 199 System DMM. The breakdown voltage is defined as the first voltage value at which the current of a capacitor is above 1 mA.

Activation Voltage 9 g of ammonium adipate (99.0%, CAS 3385-41-9) are dissolved in 91 g of water (aqua dist). The capacitor is contacted without encapsulation, and immersed up to half in the adipate solution and left in this for 24 h in order to effect as complete a penetration as possible of the ammonium adipate into the pores of the non-encapsulated capacitor. As a result of the impregnation, the adipate solution penetrates the layers lying over the oxide layer down to the oxide layer. The activation voltage is then determined. The activation voltage is the voltage at which the oxide layer starts to grow again. For determination of the activation voltage, the voltage applied to the capacitor, starting at 0 V, is increased by 1 V/s and at the same time the current is measured with a Keithley 199 System DMM (analogously to the measurement of the breakdown voltage). The activation voltage is defined as the first voltage value at which the current of a capacitor is above 5 mA. A renewed formation of oxide conventionally starts when the activation voltage is reached. The thickness of the oxide layer is thus chiefly characterized via the activation voltage.

Mean

Unless specified otherwise here, the mean is the arithmetic mean.

EXAMPLES

Example 1

868 g of deionized water and 330 g of an aqueous polystyrenesulphonic acid solution with an average molecular weight of 70,000 and a solids content of 3.8 wt. % were initially introduced into a 2 l three-necked flask with a stirrer and internal thermometer. The reaction temperature was kept between 20 and 25° C. 5.1 g of 3,4-ethylenedioxythiophene were added, while stirring. The solution was stirred for 30 min. 0.03 g of iron(III) sulphate and 9.5 g of sodium persulphate were then added and the solution was stirred for a further 24 h. After the reaction had ended, for removal of inorganic salts 100 ml of a strongly acid cation exchanger and 250 ml of a weakly basic anion exchanger were added and the solution was stirred for a further 2 h. The ion exchanger was filtered off. The poly(3,4-ethylenedioxythiophene)/polystyrenesulphonate dispersion was homogenized with a high pressure homogenizer ten times under a pressure of 700 bar. The dispersion was subsequently concentrated to a solids content of 2.5% and then additionally homogenized another five times under a pressure of 1,500 bar.

The dispersion was diluted to a concentration of 2.2% by addition of deionized water and then adjusted to a pH of 3 with aqueous ammonia.

Example 2

100 g of the dispersion from Example 1 were stirred with 10 g of polyglycerol (Mw=330, 2% diglycerol content) ("Polyglycerol-4" from SOLVAY CHEMICALS GmbH).

Example 3

100 g of the dispersion from Example 1 were stirred with 10 g of polyglycerol to (Mw=270, 29% diglycerol content) ("Polyglycerol-3" from SOLVAY CHEMICALS GmbH).

Example 4

100 g of the dispersion from Example 1 were stirred with 5 g of polyglycerol (Mw=270, 29% diglycerol content) ("Polyglycerol-3" from SOLVAY CHEMICALS GmbH).

Example 5

80 g of the dispersion from Example 1 were stirred with 20 g of polyglycerol (Mw=270, 29% diglycerol content) ("Polyglycerol-3" from SOLVAY CHEMICALS GmbH).

Example 6

70 g of the dispersion from Example 1 were stirred with 30 g of polyglycerol (Mw=270, 29% diglycerol content) ("Polyglycerol-3" from SOLVAY CHEMICALS GmbH).

Example 7

65 g of the dispersion from Example 1 were stirred with 35 g of polyglycerol (Mw=270, 29% diglycerol content) ("Polyglycerol-3" from SOLVAY CHEMICALS GmbH).

Comparison Example 1

100 g of the dispersion from Example 1 were stirred with 10 g of ethylene glycol.

Comparison Example 2

100 g of the dispersion from Example 1 were stirred with 10 g of polyethylene glycol 400 (SIGMA ALDRICH).

Example 8

8.1. Production of Oxidized Electrode Bodies

A porous aluminium foil, formed at 214 V, with dimensions of 131 mm×5 mm (anode foil) and a porous aluminium foil with dimensions of 145 mm×5 mm (cathode foil) were each provided with a contact wire and were then wound up together with two cellulose separator papers and fixed with an adhesive tape. 20 of these oxidized electrode bodies were produced. The separator paper of the oxidized electrode bodies was then carbonized in an oven at 300° C.

8.2 Production of the Solid Electrolyte

10 Parts of Polyglycerol, Mw 330

The oxidized electrode bodies were impregnated in the dispersion from Example 2 in vacuo under 50 mbar for 5 min. Thereafter, drying was carried out at 120° C. for 20 min and then at 150° C. for 20 min. The impregnation and drying were carried out again. The mean electrical values, determined before and after storage for 450 h or for 674 h at 120° C., of in each case 10 of the capacitors produced in the preceding manner are shown in Table 1. The mean activation voltage of the capacitors produced in this manner is 216 V.

Example 9

10 Parts of Polyglycerol, Mw 270

Capacitors were produced, analogously to Example 8, which in deviation therefrom were impregnated in the dispersion from Example 3. The mean electrical values of the capacitors produced in this way are to be found in Table 1. The mean activation voltage of the capacitors produced in this manner is 216 V.

Comparison Example 3

Capacitors without Polyglycerol

Capacitors were produced, analogously to Example 8, which in deviation therefrom were impregnated in the dispersion from Comparison Example 1. The mean electrical values of the capacitors produced in this way are to be found in Table 1. The mean activation voltage of the capacitors produced in this manner is 216V.

Comparison Example 4

10 Parts of Polyethylene Glycol 400

Capacitors were produced, analogously to Example 8, which in deviation therefrom were impregnated in the dispersion from Comparison Example 2. The mean electrical values of the capacitors produced in this way are to be found in Table 1, and the corresponding breakdown voltages and their ratio to the activation voltage ($\alpha 3$) in Table 2. The mean activation voltage of the capacitors produced in this manner is 216 V.

TABLE 1

|  | CAP [µF] | ESR (mΩ) | BDV [V] | ΔCAP (674 h @ 120° C.) | ΔESR (674 h @ 120° C.) |
| --- | --- | --- | --- | --- | --- |
| Example 8 (inv.) | 15.9 | 15.3 | 152 | −1.7% | ×1.0 |
| Example 9 (inv.) | 15.6 | 19.1 | 157 | −5.2% | ×1.8 |
| Comparison Example 3 | 14.2 | 27.2 | 125 | −13.8% | ×3.6 |
| Comparison Example 4 | 15.7 | 16.4 | 161 | −6.9% | ×2.5 |

It can be seen from Table 1 that the addition of polyglycerol in the PEDOT/PSS dispersions leads to a significant increase in the breakdown voltage (BDV) in the capacitor. Both the drop in capacitance (ΔCAP) and the increase in ESR (ΔESR) after storage of the capacitors for 674 h at 120° C. are smaller, and the capacitors with polyglycerol are therefore more stable to heat. The capacitor containing polyglycerol with a lower content of diglycerol (Example 8) shows a better long-term stability at high temperatures than the capacitors with the higher diglycerol content (Example 9).

TABLE 2

|  | BDV [V] | Ratio of BDV to activation energy (BDV/$V_A$) [%] |
| --- | --- | --- |
| Example 8 (inv.) | 152 | 70 |
| Example 9 (inv.) | 157 | 73 |
| Comparison Example 3 | 125 | 58 |
| Comparison Example 4 | 161 | 75 |

It can be seen from Table 2 that the breakdown voltage of the capacitors with polyglycerol is comparable to that of capacitors with polyethylene glycol (PEG), but significantly better than that of capacitors comprising ethylene glycol.

Example 10

After-Impregnation in 50% Strength Aqueous Polyglycerol, Mw 270

Capacitors were produced analogously to Comparison Example 3, which were then impregnated for 5 min in an aqueous solution containing 50 wt. % of polyglycerol ("Polyglycerol-3" from SOLVAY CHEMICALS GmbH) and then dried at 120° C. for 30 min. The values measured are summarized in Table 3. The mean activation voltage of the capacitors produced in this manner is 216 V.

Example 11

After-Impregnation in 50% Strength Aqueous Polyglycerol, Mw 330

Capacitors were produced analogously to Comparison Example 3, which were then impregnated for 5 min in an aqueous solution containing 50 wt. % of polyglycerol ("Polyglycerol-4" from SOLVAY CHEMICALS GmbH) and then dried at 120° C. for 30 min. The values measured are summarized in Table 3. The mean activation voltage of the capacitors produced in this manner is 216 V.

Comparison Example 5

PEG after-Impregnation

Capacitors were produced analogously to Comparison Example 3, which were then impregnated for 5 min in an aqueous solution containing 50 wt. % of polyethylene glycol ("PEG-400" from SIGMA ALDRICH) and then dried at 120° C. for 30 min. The values measured are summarized in Table 3. The mean activation voltage of the capacitors produced in this manner is 216 V.

TABLE 3

|  | CAP [µF] | ESR (mΩ) | BDV [V] | BDV/$V_A$ [%] | ΔCAP (674 h @ 120° C.) | ΔESR (674 h @ 120° C.) |
| --- | --- | --- | --- | --- | --- | --- |
| Example 10 (inv.) | 16.0 | 17.9 | 178 | 82 | −2.7% | ×1.0 |
| Example 11 (inv.) | 15.8 | 17.9 | 172 | 80 | −2.5% | ×1.0 |
| Comparison Example 3 | 14.2 | 27.2 | 125 | 58 | −13.8% | ×3.6 |
| Comparison Example 5 | 16.1 | 21.4 | 175 | 81 | −22.3% | ×1.7 |

It is clear from Table 3 that the breakdown voltage can be increased still further if (a relatively large amount of) polyglycerol is introduced into the capacitor in the form of an after-impregnation. Comparison Example 5 with PEG-400 furthermore shows that the long-term stability is considerably poorer than in the case of polyglycerol.

Comparison Example 6

100 g of the dispersion from Example 1 were stirred with 10 g of diglycerol (SOLVAY CHEMICALS GmbH).

Example 12

12.1 Production of Oxidized Electrode Bodies

A porous aluminium foil, formed at 36 V, with dimensions of 200 mm×3 mm (anode foil) and a porous aluminium foil with dimensions of 210 mm×3 mm (cathode foil) were each provided with a contact wire and were then wound up together with two cellulose separator papers and fixed with an adhesive tape. 20 of these oxidized electrode bodies were produced. The separator paper of the oxidized electrode bodies was then carbonized in an oven at 300° C.

12.2 Production of the Solid Electrolyte

10 Parts of Polyglycerol, Mw 270

The oxidized electrode bodies were impregnated in the dispersion from Example 3 for 15 min. Thereafter, drying was carried out at 120° C. for 20 min and then at 150° C. for 20 min. The impregnation and drying were carried out again.

The mean electrical values of the capacitors produced in the preceding manner are to be found in Table 4.

Comparison Example 7

Capacitors were produced, analogously to Example 12, which in deviation therefrom were impregnated in the dispersion from Comparison Example 6. The mean electrical values of the capacitors produced in this way are to be found in Table 4.

TABLE 4

|  | CAP [µF] | ESR (mΩ) | ΔCAP (450 h @ 120° C.) |
|---|---|---|---|
| Example 12 (inv.) | 235.6 | 28.4 | −4.9% |
| Comparison Example 7 | 240.6 | 26.4 | −8.8% |

It is clear from Table 4 that the drop in capacitance after 450 hours at 120° C. is smaller with polyglycerol than with diglycerol. Capacitors with polyglycerol therefore show a better long-term stability at high temperatures.

Example 13

13.1 Production of Oxidized Electrode Bodies

A porous aluminium foil, formed at 190 V, with dimensions of 131 mm×5 mm (anode foil) and a porous aluminium foil with dimensions of 145 mm×5 mm (cathode foil) were each provided with a contact wire and were then wound up together with two cellulose separator papers and fixed with an adhesive tape. 20 of these oxidized electrode bodies were produced. The separator paper of the oxidized electrode bodies was then carbonized in an oven at 300° C.

13.2 Production of the Solid Electrolyte

The oxidized electrode bodies were impregnated in the dispersion from Example 5 for 15 min. Thereafter, drying was carried out at 120° C. for 20 min and then at 150° C. for 20 min. The impregnation and drying were carried out again.

The mean electrical values of the capacitors produced in the preceding manner are to be found in Table 5.

Example 14

Capacitors were produced, analogously to Example 13, which in deviation therefrom were impregnated in the dispersion from Example 6. The mean electrical values of the capacitors produced in this way are to be found in Table 5.

Example 15

Capacitors were produced, analogously to Example 13, which in deviation therefrom were impregnated in the dispersion from Example 7. The mean electrical values of the capacitors produced in this way are to be found in Table 5.

Comparison Example 8

Capacitors were produced, analogously to Example 13, which in deviation therefrom were impregnated in the dispersion from Comparison Example 6. The mean electrical values of the capacitors produced in this way are to be found in Table 5.

TABLE 5

|  | CAP [µF] | ESR (mΩ) | BDV [V] |
|---|---|---|---|
| Example 13 (inv.) | 14.2 | 21.0 | 135 |
| Example 14 (inv.) | 14.1 | 20.2 | 144 |
| Example 15 (inv.) | 14.0 | 18.2 | 148 |
| Comparison Example 8 | 14.2 | 27.2 | 127 |

It is clear from Table 5 that the breakdown voltage can be increased still further by an addition if (a relatively large amount of) polyglycerol is introduced into the capacitor with the dispersion. The ESR is furthermore reduced significantly.

Example 16

The preparation of the dispersion was repeated as in Example 1, but the pH was adjusted to a pH of 7 with aqueous ammonia.

Example 17

Example 2 was repeated, but in deviation the dispersion from Example 16 was used.

Example 18

Example 3 was repeated, but in deviation the dispersion from Example 16 was used.

Example 19

Capacitors were produced, analogously to Example 8, which in deviation therefrom were impregnated in the dispersion from Example 17. The mean electrical values of the capacitors produced in this way are to be found in Table 6.

Example 20

Capacitors were produced, analogously to Example 8, which in deviation therefrom were impregnated in the dispersion from Example 18. The mean electrical values of the capacitors produced in this way are to be found in Table 6.

Example 21

Capacitors were produced, analogously to Example 8, which in deviation therefrom were impregnated in the dispersion from Example 4. The mean electrical values of the capacitors produced in this way are to be found in Table 6.

TABLE 6

| | CAP [μF] | ESR (mΩ) | BDV [V] | ΔCAP (674 h@120° C.) | ΔESR (674 h@120° C.) |
|---|---|---|---|---|---|
| Example 19 (inv) | 15.6 | 20.0 | 155 | −5.7% | ×1.8 |
| Example 20 (inv) | 15.6 | 20.4 | 152 | −5.2% | ×1.8 |
| Example 21 (inv) | 16.5 | 20.5 | 145 | −4.2% | ×1.7 |

LIST OF REFERENCE SYMBOLS

1 Electrode body
2 Electrode material
3 Dielectric
4 Surface
5 Anode body
6 Solid electrolyte
7 Capacitor body
8 Impregnating agent
9 Pores
10 Forming voltage
11 Measurement curve for determination of the activation voltage

The invention claimed is:

1. A capacitor comprising an electrode body of an electrode material, wherein a dielectric at least partly covers a surface of the electrode material and forms an anode body,
    wherein the anode body is at least partly coated with a solid electrolyte which comprises a conductive polymer,
    wherein the capacitor comprises at least one polyglycerol, and wherein for the ratio of the amount by weight of polyglycerol ($M_{pg}$) in the capacitor and the amount by weight of conductive polymer ($M_{polymer}$) in the capacitor:
    $M_{pg}/M_{polymer} > 0.15$,
wherein the polyglycerol contains more than 50 wt. % of a mixture of a tri- and tetraglycerol, based on the total weight of the polyglycerol.

2. The capacitor according to claim 1, wherein for the $M_{pg}/M_{polymer}$ ratio:
    $M_{pg}/M_{polymer} > 0.2$.
3. The capacitor according to claim 1, wherein for the $M_{pg}/M_{polymer}$ ratio:
    $M_{pg}/M_{polymer}$ is in a range of from 0.2 to 80.
4. The capacitor according to claim 1, wherein for the $M_{pg}/M_{polymer}$ ratio:
    $M_{pg}/M_{polymer}$ is in a range of from 2.5 to 30.
5. The capacitor according to claim 1, wherein the capacitor is an aluminium capacitor.
6. The capacitor according to claim 1, wherein the conductive polymer comprises a polythiophene.
7. The capacitor according to claim 6, wherein the polythiophene comprises a poly(3,4-ethylenedioxythiophene).
8. The capacitor according to claim 6, wherein the conductive polymer comprises a complex of poly(3,4-ethylenedioxythiophene) and polystyrenesulphonic acid.
9. The capacitor according to claim 1, wherein the conductive polymer comprises a polythiophene with recurring units of the general formula (I) or (II)

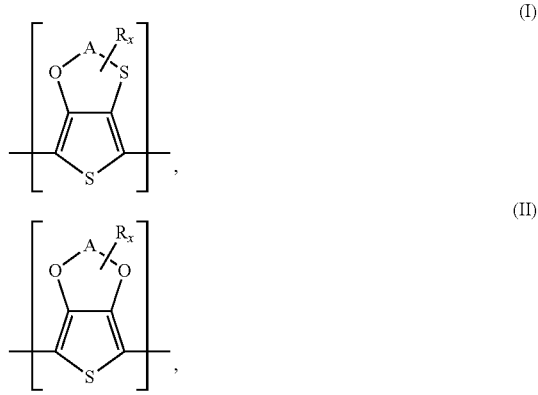

wherein
A represents an optionally substituted $C_1$-$C_5$-alkylene radical,
R represents a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical,
x represents an integer from 0 to 8 and
in the case where several radicals R are bonded to A, these can be identical or different.
10. The capacitor according to claim 1, wherein the conductive polymer comprises a polyanion.
11. The capacitor according to claim 10, wherein the polyanion comprises a polystyrenesulphonic acid.
12. A process for the production of a capacitor, comprising the process steps:
    a1) providing an electrode body of an electrode material, wherein a dielectric covers one surface of this electrode material at least partly to form an anode body;
    b1) introducing a dispersion comprising
        a conductive polymer,
        at least one polyglycerol, and
        a dispersing agent
    into at least a part of the anode body;

c1) at least partially removing the dispersing agent to obtain a capacitor body;
or
a2) providing an electrode body of an electrode material, wherein a dielectric covers one surface of the electrode material at least partly to form an anode body;
b2) introducing a dispersion comprising
a conductive polymer, and
a dispersing agent
into at least a part of the anode body;
c2) at least partially removing the dispersing agent to obtain a capacitor body;
d2) bringing into contact at least one polyglycerol, as an impregnating agent, with the capacitor body;
or
a3) providing an electrode body of an electrode material, wherein a dielectric covers one surface of the electrode material at least partly to form an anode body;
b3) introducing a dispersion comprising
a conductive polymer,
at least one polyglycerol, and
a dispersing agent
into at least a part of the anode body;
c3) at least partially removing the dispersing agent to obtain a capacitor body;
d3) bringing into contact at least one polyglycerol, as an impregnating agent, with the capacitor body;
wherein the polyglycerol is employed in an amount such that for the ratio of the amount by weight of polyglycerol ($M_{pg}$) in the capacitor and the amount by weight of conductive polymer ($M_{polymer}$) in the capacitor:
$M_{pg}/M_{polymer} > 0.15$,
wherein the polyglycerol contains more than 50 wt. % of a mixture of a tri- and tetraglycerol, based on the total weight of the polyglycerol.

13. The process according to claim 12, wherein the polyglycerol is employed in an amount such that for the $M_{pg}/M_{polymer}$ ratio:
$M_{pg}/M_{polymer} > 0.2$.

14. The process according to claim 12, wherein the polyglycerol is employed in an amount such that for the $M_{pg}/M_{polymer}$ ratio:
$M_{pg}/M_{polymer}$ is in a range of from 0.2 to 80.

15. The process according to claim 12, wherein the conductive polymer comprises a polythiophene.

16. The process according to claim 15, wherein the conductive polymer comprises a complex of poly(3,4-ethylenedioxythiophene) and polystyrenesulphonic acid.

17. The process according to claim 12, wherein the conductive polymer comprises a polythiophene with recurring units of the general formula (I) or (II)

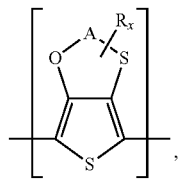
(I)

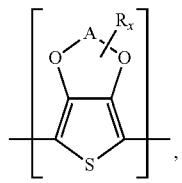
(II)

wherein
A represents an optionally substituted $C_1$-$C_5$-alkylene radical,
R represents a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical,
x represents an integer from 0 to 8 and
in the case where several radicals R are bonded to A, these can be identical or different.

18. The process according to claim 12, wherein the conductive polymer comprises a polyanion.

19. The process according to claim 12, wherein the impregnating agent is employed in process step d2) and d3) is in the form of a solution comprising a solvent and the impregnating agent and in a further process step e2) or e3) the solvent is at least partly removed from the electrode body.

20. A dispersion comprising a conductive polymer and at least one polyglycerol, wherein the polyglycerol contains more than 50 wt. % of a mixture of a tri- and tetraglycerol, in each case based on the total weight of the polyglycerol.

21. The dispersion according to claim 20, wherein the dispersion comprises 0.4 to 40 wt.-% of the polyglycerol, based on the total weight of the dispersion.

22. The dispersion according to claim 20, wherein the dispersion comprises 4 to 13 wt.-% of the polyglycerol, based on the total weight of the dispersion.

* * * * *

UNITED STATES PATENT AND TRADEMARK OFFICE
CERTIFICATE OF CORRECTION

| | |
|---|---|
| PATENT NO. | : 9,502,183 B2 |
| APPLICATION NO. | : 14/020311 |
| DATED | : November 22, 2016 |
| INVENTOR(S) | : Armin Sautter et al. |

Page 1 of 1

It is certified that error appears in the above-identified patent and that said Letters Patent is hereby corrected as shown below:

On the Title Page

(75) Inventors:, delete "Armin Saulter" and replace with --Armin Sautter--.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*